Feb. 16, 1971     W. MOSKOWITZ     3,562,927

VISUAL EDUCATION DEVICE

Filed Oct. 30, 1967

INVENTOR
W. MOSKOWITZ
BY
Herbert M. Shapiro
ATTORNEY 3,562,927
VISUAL EDUCATION DEVICE
William Moskowitz, Somerville, N.J., assignor to Multisensory Systems, Somerville, N.J., a partnership of New Jersey
Filed Oct. 30, 1967, Ser. No. 679,078
Int. Cl. G09b 19/00
U.S. Cl. 35—22                      1 Claim

ABSTRACT OF THE DISCLOSURE

Tracks are provided in a sheet included in an audio circuit. A user employs a stylus to follow a track and the audio circuit emits a sound each time the stylus strays from the track. A plurality of embodiments are described where motion is imparted to the tracks.

FIELD OF THE INVENTION

This invention relates to visual education devices, and more particularly, to such devices which call into play a plurality of the human sensory systems.

BACKGROUND OF THE INVENTION

Education has assumed a formalized pattern requiring specified performance by individuals for advancement to consecutive levels of proficiency. It is generally acknowledged, however, that certain human skills must be developed to acceptable levels before an individual may profit from a study of the usual educational formalisms.

Most pre-educational skills relate to visual-perceptual development and it is to deficiencies in such development that poor educational achievement may often be attributed. The deficiencies may be restated in more specific terms as a failure to properly interpret and integrate visual inputs into the total sensory system. Thus, for example, an individual may exhibit an inability to recognize forms, a condition which when aggravated may lead to an inability to negotiate the daily obstacle course which one encounters in the real world.

There is little in the art for dealing with such deficiencies. Various instruments do provide, for example, a moving track which simulates movement along a roadway. The observer manipulates a simulated automobile steering wheel in order to remain on the roadway. Instruments of this type, however, require only simple rotory motions of the trainee. Such simple motions do not develop the motor responses requisite for acceptable visual-motor integration.

BRIEF DESCRIPTION OF THE INVENTION

The present invention stems from a realization that form perception, and the proper response thereto, is based on the development of meaningful responses to more basic forms from which more frequently encountered complex forms may be constructed. This realization is turned to account by providing apparatus defining a path of prescribed geometry which a trainee is to follow with a stylus.

It is important that arm and finger motion of the trainee be encouraged in order to elicit simple motor responses to the visual input. A device in accordance with this invention requires movement to this end. In its simplest form such a device provides a path which remains stationary and which includes simple straight line forms, circles, and oblique lines to be followed by the trainee. Importantly, feedback to the trainee is provided in a form to call into play an additional sensory system.

In one specific embodiment of this invention, the paths are etched from an electrically conducting sheet to expose an electrically insulating substrate. The conducting sheet is included electrically in an oscillator circuit. The stylus serves to complete the circuit and to thus activate the oscillator when the trainee strays from the prescribed path. The sound emitted from the oscillator serves to indicate the failure of the trainee to follow the path or track. The device is referred to hereinafter by the term "Audio Track."

The device is basically a therapeutic instrument which may be programmed, for example, by successively harder and more complicated paths which demand more complex hand movements and thus encourage increasingly more proficient performance.

The use of the instrument is fun and the feedback provides an incentive for achievement. Consequently, the costly burden of expensive supervision for visually deprived children is reduced to a more manageable level. Inasmuch as the use of the instrument is fun, an educational toy is provided.

DETAILED DESCRIPTION

Figure 1:
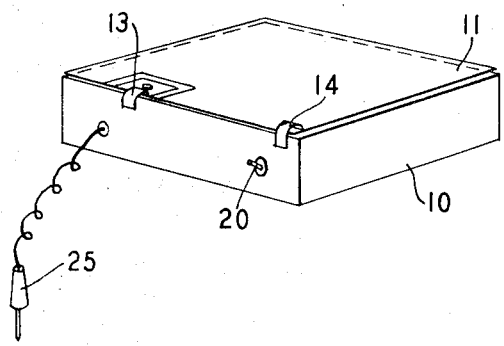
FIG. 1 is a plan view of an arrangement of an Audio Track in accordance with this invention.

FIG. 1 shows an enclosure 10 having an insulating top upon which a planar member 11 is mounted. Member 11 is held on the top of enclosure 10 by resilient clamps 13 and 14.

Figure 2A:
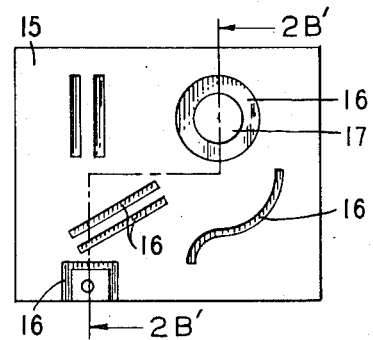
FIGS. 2a and 2b are top and cross sectional views of a portion of the arrangement of FIG. 1.
Figure 2B:
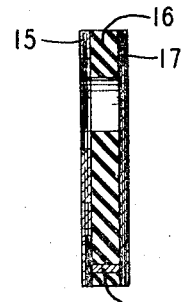

Member 11 is shown in more detailed top and cross-sectional views in FIGS. 2a and 2b, FIG. 2b being taken at section line 2B'—2B' in FIG. 2a. Member 11 comprises a plurality of layers 15, 16, and 17. Layers 15 and 17 are electrically conducting; layer 16 is insulating. A copper clad Mylar sheet is useful to this end.

Layer 15 is apertured to form a plurality of paths or tracks exposing the insulating layer 16 therebeneath. The exposed paths of insulating material may, in the most simple form take the shape of straight lines, vertical or horizontal, or of annular or shallow –s– geometry as shown in FIG. 2a. When an annular geometry is formed, the central conducting material is insulated from the remainder of layer 15. Electrical connection is provided by layer 17, however. Specifically layer 17 may be connected directly to layer 15 forming a single electrical entity. Layer 15 may be apertured at an edge thereof, as shown in FIG. 2A, to isolate one portion of the layer from the remainder. An electrical connection 19 is made through insulating layer 16 to layer 17 to provide two electrical entities having exposed portions for contact in the plane of layer 15. Resilient clamp 13 makes electrical contact to the isolated portion of layer 15 and thus to layer 17. Clamp 14 makes contact to the remainder of layer 15.

Figure 3:
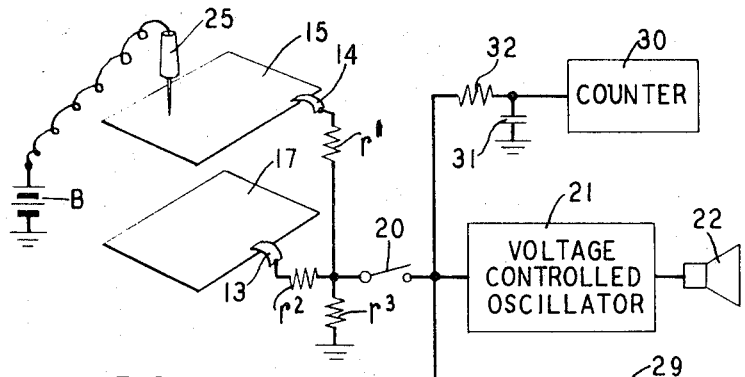
FIGS. 3 and 5 are schematic illustrations of circuits employable in the arrangement of FIG. 1.

Clamp 14 is connected electrically through a switch 20 shown both in FIG. 1 and FIG. 3. When switch 20 is closed, clamp 14 is connected through a resistor R1 to a voltage controlled oscillator 21. Oscillator 21 is, in turn, connected to a speaker 22. An appropriately insulated electrically conducting stylus 25 is connected to a power source indicated as a battery B. Battery B is connected to ground.

Enclosure 10 houses the circuit of FIG. 3 providing a convenient receptacle with a surface to which member 11 may be mounted. The enclosure slopes slightly, much as a school desk slopes (about 20°) in order to orient member 11 for easy use.

The trainee now holds the stylus, flips switch 20 of FIG. 1 to the closed condition and attempts to follow one of the paths such as a diagonal path defined by insulator 16 in FIG. 2A. As long as stylus 25 is in contact with the insulating material, no power is supplied to the oscillator and the speaker emits no sound. Should the stylus make contact with layer 15 of member 11 as shown in FIG. 3, a voltage determined by resistors $r1$ and $r3$ is supplied to the oscillator and speaker 22 emits a tone the frequency of which is determined by those resistors.

When the annular geometry of FIG. 2A is followed by the trainee, first and second tones may be used to record errors in movement. A first tone is heard if the trainee moves to the outside of the annulus. A second tone is heard if the trainee moves to the inside. To this end, clamp 13 is connected to oscillator 21 via switch 20 and resistor $r2$ as shown in FIG. 3. When the stylus contacts layer 15, one sound is emitted from speaker 21 determined by resistors $r1$ and $r3$. When layer 17 is contacted, a different sound is emitted as determined by the resistors $r2$ and $r3$. Corresponding circular apertures in layers 15 and 16 are also useful in the latter type of embodiment, as well as more complex apertures in layer 15 only because layer 17 is exposed for contact. A plurality of such circular apertures may be arranged in a complex pattern for a trainee to follow one to the next.

Figure 4:
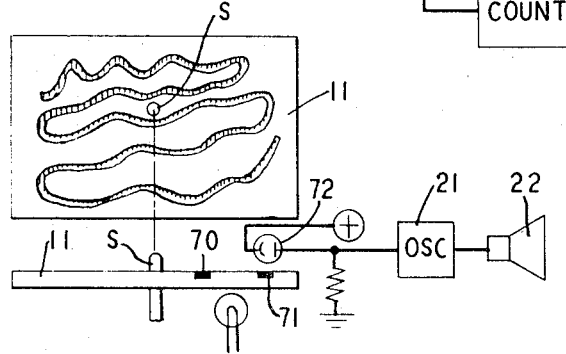
FIG. 4 is an opaque track on a transparent board mounted for rotation.

Member 11 may be removed from its position secured by clamps 13 and 14 merely by pulling member 11 free. Replacement by alternative members of like construction is equally simple, the required electrical connection being established merely by inserting the replacement member into clamps 13 and 14. By substituting members with more difficult and/or narrower insulating paths exposed, increased proficiency may be programmed. A replacement member having a relatively complicated free-form path is shown in FIG. 4.

The number of sounds emitted by speaker 22 reflects the number of errors made by the trainee. A counter 29, shown in FIG. 3, may be connected to oscillator 21 to record the number of times the oscillator is powered during training with a particular member 11. The trainees' progress is conveniently quantified in this manner. A second counter 30 may also be provided. Counter 30 is driven through a low pass filter including capacitor 31 and resistor 32 and is used to record the number of errors in excess of an arbitrary minimum duration.

In arrangements where a plurality of sounds are provided by contact to a plurality of conducting layers, it is useful to switch capacitance values rather than to vary the voltage or impedance. When a frequency determining capacitor is switched in any of the well known oscillators (i.e., Hartly, Coldpits, Phase shift, etc.), the impedance level or voltage at which the circuit operates is not charged so that the D-C biasing conditions and, therefore, the drift propensities are not altered.

Figure 6:
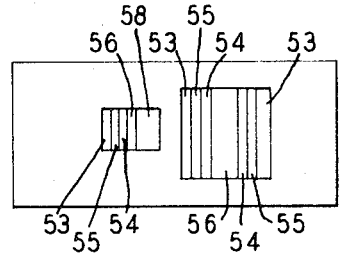
FIGS. 6 and 7 are schematic top and crosssectional views of an alternative embodiment in accordance with this invention.
Figure 5:
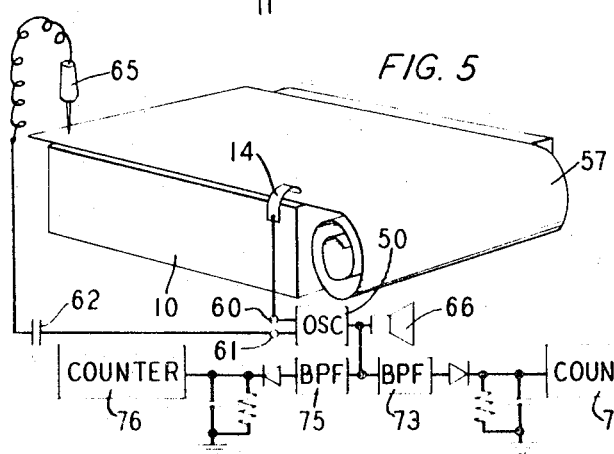
Figure 7:
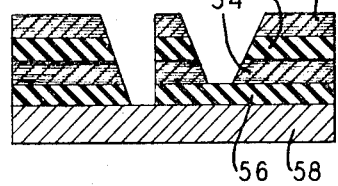

A plurality of conducting layers spaced apart by insulating layers may provide a plurality of capacitances for selective insertion to determine the frequency of an oscillator 50, as shown in FIG. 5, when those layers are properly apertured for access. Illustratively, alternate sheets of metal foil 53 and 54 and of dielectric material 55 and 56 are joined together to form a flexible laminate structure 57 as shown in FIGS. 6 and 7 in top and cross-sectional view. A first portion of the structure is wound upon itelf as shown in FIG. 5. A second portion is extended and may be mounted on a rigid support member 58 as shown in FIG. 7. In this illustrative embodiment, the support member 58 is electrically conducting. The conducting support member may be mounted, in turn, on a housing such as housing 10 of FIG. 1.

The clamp 14, making contact with the top sheet 53, as shown in FIG. 5, is connected to oscillator 50 at a terminal 60. The oscillator 50 is responsive to the capacitance between terminal 60 and an additional terminal 61 of the oscillator for providing a tone having a corresponding frequency. For example, oscillator 50 might be a phase shift-oscillator and terminals 60 and 61 would be terminals in the feedback path between which a minimum value capacitor would be necessary before a tone would be produced. A capacitor 62 would exceed this minimum value so that by touching a stylus 65 to the sheet 53, a tone would be emitted from speaker 66. Touching the stylus 65 to sheet 54 would reduce the capacitance between terminals 60 and 61 and thereby modify the frequency of the tone. Similarly, touching the stylus 65 to supporting member 58 would further reduce the capacitance.

This structural arrangement may be employed to provide all the results of the first embodiment. Additional advantages may be derived, however. The layers 53, 54, and 55 may be removed selectively to provide an insulating path to be traced on the layer 56. If the stylus 65 deviates from the path and touches the layer 54, a first tone is emitted. If the stylus deviates further touching layer 53, a different tone is emitted. Audio feedback to the operator indicates the extent of deviation. A band-pass filter 73 driving a counter 74 may be employed to indicate the number of times a minor deviation occurs and a bandpass filter 75 driving counter 76 may indicate the number of major deviations.

A second path is provided by removing portions of layers 53, 54, 55, and 56 exposing support member 58. In this embodiment, the stylus is moved from contact with supporting member 58 crossing all the sheets as the path is traversed correctly. If the path is followed at a prescribed rate, a musical tune is emitted from speaker 22. Of course, using metal foil and thin dielectric layers, numbers of layers can be formed in intricate shapes exposing the layers in any arbitrary order.

Even more difficult paths may be defined in each of the described embodiments by providing repetitive movement to the path, as for example, by rotary motion. Rotary motion may be achieved simply by adapting member 11 to a turntable by, for example, providing a suitable aperture therein for receiving a spindle and by arranging clamps 13 and 14 of FIG. 1 as commutators in an electric motor. Enclosure 10 of FIG. 1 may include a suitable turntable motor to this end.

An additional embodiment in accordance with this invention includes a translucent member 11 rather than an insulating member. A light is provided to shine through the member 11. Opaque paths are provided over member 11 to provide the paths for the trainee to follow. The paths need not be defined with electrically conducting material. Member 11 in this instance is adapted to rotational movement in the absence of commutators. The stylus in such an arrangement need only include a photocell responsive to the light for activating an oscillator in enclosure 10 as shown in FIG. 1. As long as the opaque path is being followed, the oscillator is off. When the trainee strays from the path, the oscillator is activated.

The circuitry for this arrangement is shown in FIG. 4. Member 11 is mounted for rotation by including therein a spindle receiving aperture S for a spindle SP of any suitable turntable arrangement. The opaque path is indicated by the black sections 70 and 71 in member 11 in FIG. 4 and need not be conducting. The stylus is indicated by a photocell 72 connected between a source of positive potential and ground through a resistor (not designated). The connections to oscillator 21 and speaker 22 are as shown in FIG. 3. Operation is essentially as described in connection with FIG. 3. Further complexity is provided by an arrangement which permits viewing of the rotating form only by reflection from, for example, a mirror.

The embodiments described are considered to be only illustrative of the principles of this invention. Accordingly, various other embodiments may be devised by one skilled in the art without deviating from the spirit and scope thereof.

What is claimed is:

1. A device for stimulating visual-motor integration comprising a planar member having a first light transmitting characteristic, means defining a path having a second light transmitting characteristic on said member, means for imparting rotational motion to said member, a light source mounted on one side of said member, and an indicating circuit means including an electrically actuated indicating means and a manually manipulatable photosensitive probe, whereby said probe may be moved along said path on the side of said rotating member opposite said light source, with any deviation of said probe relative to said path causing actuation of said indicating means.

References Cited

UNITED STATES PATENTS

| | | | |
|---|---|---|---|
| 2,309,216 | 1/1943 | Rocuskie | 35—22 |
| 2,521,500 | 9/1950 | Braund | 35—22 |
| 2,808,263 | 10/1957 | Goldfinger et al. | 35—22 |
| 3,029,526 | 4/1962 | Olalainty | 35—22 |
| 3,040,322 | 6/1962 | Mahaney et al. | 84—1.18 |
| 3,208,747 | 9/1965 | Kavakos | 35—22 |
| 3,333,846 | 8/1967 | Glass et al. | 35—22 |
| 3,405,223 | 10/1968 | Pavia | 84—1.18 |
| 2,420,716 | 5/1947 | Morton et al. | 35—35.1UX |
| 3,250,023 | 5/1966 | Benson | 35—35.1 |

WILLIAM H. GRIEB, Primary Examiner